US012321376B2

(12) United States Patent
McCormick et al.

(10) Patent No.: US 12,321,376 B2
(45) Date of Patent: Jun. 3, 2025

(54) SYSTEMS AND METHODS FOR MANAGING A DATABASE STORING CLAUSES

(71) Applicant: RELX Inc., Miamisburg, OH (US)

(72) Inventors: Danielle E. McCormick, London (GB); Benjamin Adler, Leeds (GB); Madeleine Graham, St Albans (GB)

(73) Assignee: RELX Inc., Miamisburg, OH (US)

(*) Notice: Subject to any disclaimer, the term of this patent is extended or adjusted under 35 U.S.C. 154(b) by 0 days.

(21) Appl. No.: 17/863,623

(22) Filed: Jul. 13, 2022

(65) Prior Publication Data
US 2023/0020047 A1   Jan. 19, 2023

Related U.S. Application Data

(60) Provisional application No. 63/221,260, filed on Jul. 13, 2021.

(51) Int. Cl.
*G06F 16/38* (2019.01)
*G06F 40/166* (2020.01)

(52) U.S. Cl.
CPC ............ *G06F 16/38* (2019.01); *G06F 40/166* (2020.01)

(58) Field of Classification Search
None
See application file for complete search history.

(56) References Cited

U.S. PATENT DOCUMENTS

| | | | |
|---|---|---|---|
| 7,028,259 B1 | 4/2006 | Jacobson | |
| 7,080,076 B1 * | 7/2006 | Williamson | G06F 40/166 707/999.102 |
| 7,594,174 B2 | 9/2009 | Truelove et al. | |
| 8,914,721 B2 | 12/2014 | Dallari et al. | |
| 10,268,669 B1 | 4/2019 | Allen | |
| 10,372,798 B2 | 8/2019 | Nordine et al. | |
| 11,079,917 B2 | 8/2021 | Gibbs et al. | |
| 2006/0242569 A1 * | 10/2006 | Grigoriadis | G06F 40/186 715/205 |
| 2008/0306784 A1 * | 12/2008 | Rajkumar | G06F 40/186 705/342 |
| 2012/0036125 A1 | 2/2012 | Al-Kofahi et al. | |
| 2014/0047330 A1 * | 2/2014 | Yan | G06Q 10/101 715/273 |
| 2015/0227989 A1 | 8/2015 | Chattopadhyay et al. | |
| 2016/0117489 A1 * | 4/2016 | Furuichi | G06F 16/955 726/1 |
| 2021/0216704 A1 | 7/2021 | Peterson et al. | |

OTHER PUBLICATIONS

Notification of Transmittal of the International Search Report and the Written Opinion issued in corresponding International Application No. PCT/US2022/036937 mailed on Nov. 15, 2022.

* cited by examiner

*Primary Examiner* — Kannan Shanmugasundaram
(74) *Attorney, Agent, or Firm* — Dinsmore & Shohl LLP

(57) ABSTRACT

System and methods for managing a clauses database for use with creating electronic documents are disclosed. In one embodiment, a computer-implemented method for updating a database includes receiving, from a graphical user interface, a clause, the graphical user interface comprising an electronic document panel and a clauses panel, receiving, from the clauses panel, a clause approval assignment that assigns the clause to an approver; receiving, from the approver, an approval or a denial of the clause, and when an approval is received, storing the clause in the database, wherein the clause is marked as approved.

11 Claims, 17 Drawing Sheets

SYSTEMS AND METHODS FOR MANAGING A DATABASE STORING CLAUSES

CROSS-REFERENCE TO RELATED APPLICATIONS

This application claims the benefit of priority under 35 U.S.C. § 119 to U.S. Provisional Application No. 63/221,260, filed on Jul. 13, 2021 and entitled "SYSTEMS AND METHODS FOR CONTENT PROOFREADING AND ERROR CORRECTION," the contents of which are hereby incorporated by reference in its entirety.

BACKGROUND

Electronic documents, such as legal contracts, frequently include many standard clauses that are common across different legal contracts. For example, a warranty clause in a contract may contain language that is the same or similar across many contacts written by members of an organization, such as a law firm or a company. However, although the intent of an organization may be for all agreements to use the same language for certain clauses of legal contracts, individuals of the organization may use different language. Further, changes in the law or market may dictate that language to clauses be updated. However, some individuals within an organization may be unaware of such changes and continue to use outdated clause language.

Accordingly, alternative methods for managing clauses used in electronic documents are desired.

SUMMARY

In one embodiment, a computer-implemented method for updating a database includes displaying an electronic document panel within a word processing graphical user interface, wherein the electronic document panel displays text of an electronic document, and displaying a clauses panel within the word processing graphical user interface. The clauses panel includes a clauses text box and an approval graphical user element. The method further includes receiving, from one of the electronic document panel and the clauses panel, a clause, populating the clauses text box with the clause, receiving a selection of an approver from the approval graphical user element, and automatically transmitting an approval request to the approver to approve or deny the clause. When an approval is received from the approver, the method includes automatically storing the clause in the database, wherein the clause is marked as approved such that the clauses panel displays the clause as approved. When no approval or denial is received, the method includes automatically storing the clause in the database, wherein the clause is marked as awaiting approval such that the clauses panel displays the clause as awaiting approval.

In another embodiment, a computer-implemented method for updating a database includes receiving, from a graphical user interface, a clause, the graphical user interface comprising an electronic document panel and a clauses panel, receiving, from the clauses panel, a clause approval assignment that assigns the clause to an approver; receiving, from the approver, an approval or a denial of the clause, and when an approval is received, storing the clause in the database, wherein the clause is marked as approved.

In yet another embodiment, a system for updating a database includes one or more processors, a non-transitory, computer-readable medium storing instructions that, when executed by the one or more processors, cause the one or more processors to: receive, from a graphical user interface, a clause, the graphical user interface comprising an electronic document panel and a clauses panel, receive, from the clauses panel, a clause approval assignment that assigns the clause to an approver, receive, from the approver, an approval or a denial of the clause, and when an approval is received, storing the clause in the database, wherein the clause is marked as approved.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Embodiments of the present disclosure are directed to systems and methods for managing a clauses database whereby users can add new clauses (also referred to herein as "snippets") to the clauses database, edit existing clauses in the clauses database, approve new clauses that are submitted to the clauses database, and use the clauses database to select clauses for automatic insertion into an electronic document. The embodiments described herein enable users to add up-to-date language to electronic documents, all within the word processing environment. An approval process ensures that that the clauses within the database are up-to-date and accurate. The graphical user interfaces described herein allow users to quickly and accurately create electronic documents in a manner not previously possible.

Moreover, embodiments of the present disclosure describe a software application that operates in conjunction with and within an environment of a graphical word processing application and enables the creation of digital content (e.g., various types of electronic legal documents) without the need to leave the environment of the graphical word processing application. In an example, the software application described herein may be an add-in that is accessed by an icon adjacent to one or more icons associated with various features of an example graphical word processing program.

Various embodiments of graphical user interfaces and clause databases are described in detail below.

Figure 1:
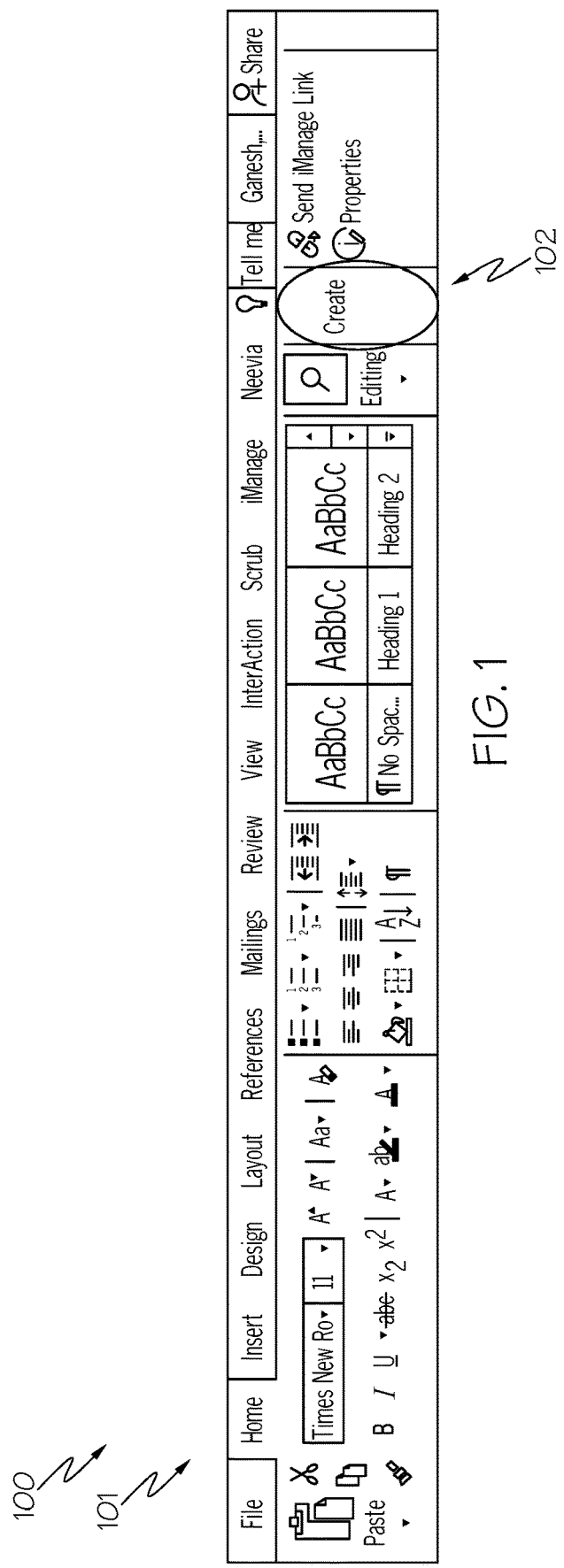
FIG. 1 is an example menu of a graphical user interface of a word processing application according to one or more embodiment described and illustrated herein.

FIG. 1 illustrates a portion of an example word processing graphical user interface 100 of a word processing application executed on a computing device, such as a laptop computer, tablet computer, mobile device, server, or desktop computer, for example. Embodiments may be used in any word processing application such as, without limitation, Microsoft Word and Apple Pages. The word processing graphical user interface 100 may include a menu having icons representing a plurality of tools and options available to a user. The software program of the present application may be configured as a plug-in of the word processing application. An icon 102 providing access to the software program of the present application may be accessed by a user selecting the icon 102. It should be understood that in other embodiments the software application is a stand-alone software program and not configured as a plug-in.

Figure 2:
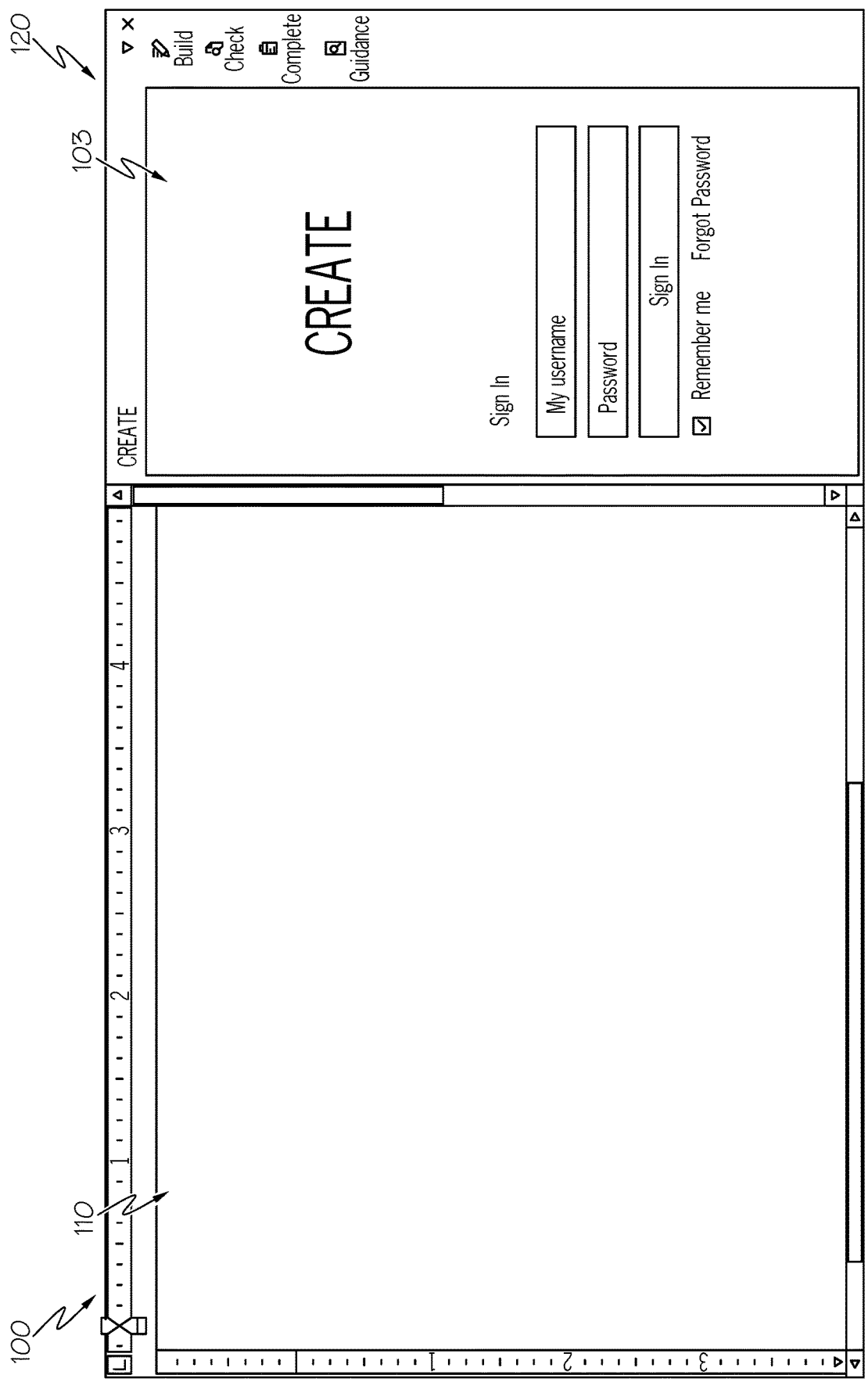
FIG. 2 is an example graphical user interface of a word processing application having an electronic document panel and a clauses panel displaying an authentication interface according to one or more embodiment described and illustrated herein.

When a user selects the icon 102, in response, the word processing graphical user interface is split into an electronic document panel 110 and a clauses panel 120. The electronic document panel 110 operates as a traditional environment for word processing. An electronic document is displayed in the electronic document panel 110 for document creation and editing. The clauses panel 120 provides a window for a user to access the functionalities of the present disclosure. In some embodiments, the clauses panel 120 may provide an authentication interface 103 for a user to login to the service providing the functionalities of the present disclosure. FIG. 2 depicts an example authentication interface 103 wherein a user is authenticated by entering his or her username and password. It should be understood that in other embodiments no authentication interface is provided.

Figure 3:
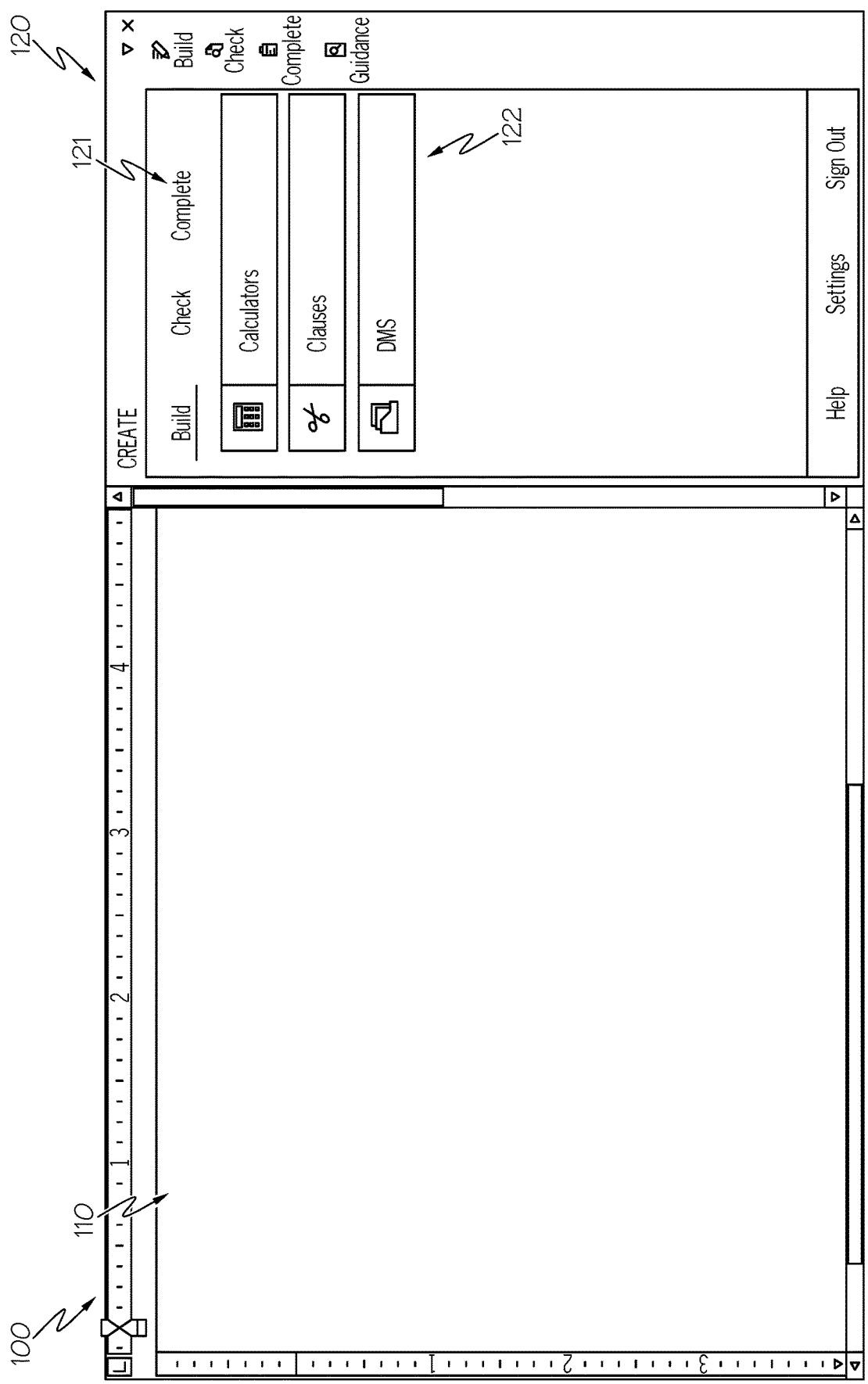
FIG. 3 is an example graphical user interface wherein the clauses panel displays icons providing various functionalities according to one or more embodiment described and illustrated herein.

After successfully receiving authentication credentials, the clauses panel 120 may display a plurality of graphical elements that provide access to various functionalities of the embodiments of the present disclosure are displayed. FIG. 3 illustrates a non-limiting example of a home graphical user interface. It should be understood that other user interfaces may be provided for the home graphical user interface. In the illustrated example, the home graphical user interface includes a plurality of features icons 121, which include a "Build" icon, a "Check" icon, and a "Complete" icon. Each feature icon 121 has one or more tools associated therewith. These tools are represented by tool icons 122.

For example, upon selection of the "Build" icon, various tools such as, without limitation, "Calculators", "Clauses", and "DMS" may be displayed. It should be understood that embodiments are not limited to these tools. In embodiments, upon selection of the "Calculators" category, features for performing arithmetic calculations, value added tax (VAT) calculations, consumer price index (CPI) calculations, retail price index (RPI) calculations, fixed and variable interest calculations, gross to net salary calculations, currency conversions, etc., within the electronic document within the electronic document panel 110 may be provided. It is noted that each of these calculations may be performed without requiring the user to exit the add-in environment or the environment of the graphical word processing environment.

In some embodiments, upon selecting the "Clauses" category, information regarding precedents related to legal topics, doctrines, saved clauses, etc., may be displayed. Additional detail regarding the "Clauses" feature is provided below.

In some embodiments, upon selecting the "DMS" category, a user may be able to access digital content such as electronic documents within a document management system (DMS) that is linked to the add-in and the graphical word processing program. In some embodiments, the user may also be able to perform a key word search of the DMS by inputting one or more phrases in a text field displayed within the add-in interface.

The "Clauses" feature provides access to a plurality of clauses of text that are saved within a database. These clauses of text are also referred to herein as "snippets." It is common for legal contracts to include common clauses. The clauses may be preferred clauses that are preferred by an organization, such as a law firm or a corporation. It may be desirable for contracts of an organization to be consistent across the organization. However, with organizations having many employees, there is a risk that different employees use different clauses, which could have a negative impact on the organization. Embodiments of the present disclosure allow individual clauses to be saved and stored in a clauses database. These clauses are then available for use by members of the organization when creating or editing electronic documents, such as legal contract.

Figure 4:
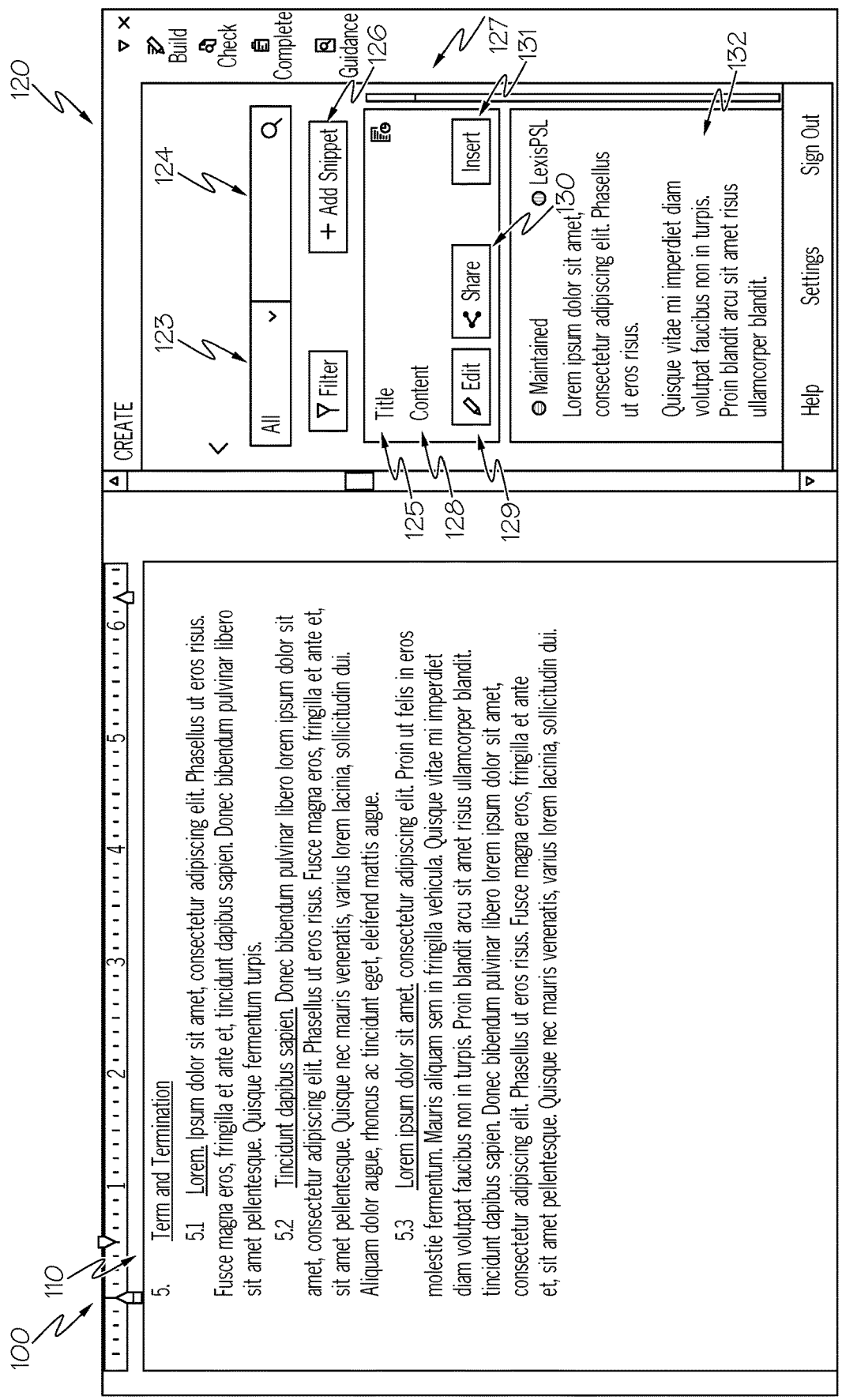
FIG. 4 is an example graphical user interface of a word processing application wherein the electronic document panel displays an electronic document and the clauses panel displays an interface for searching a clauses database according to one or more embodiment described and illustrated herein.
Figure 5:
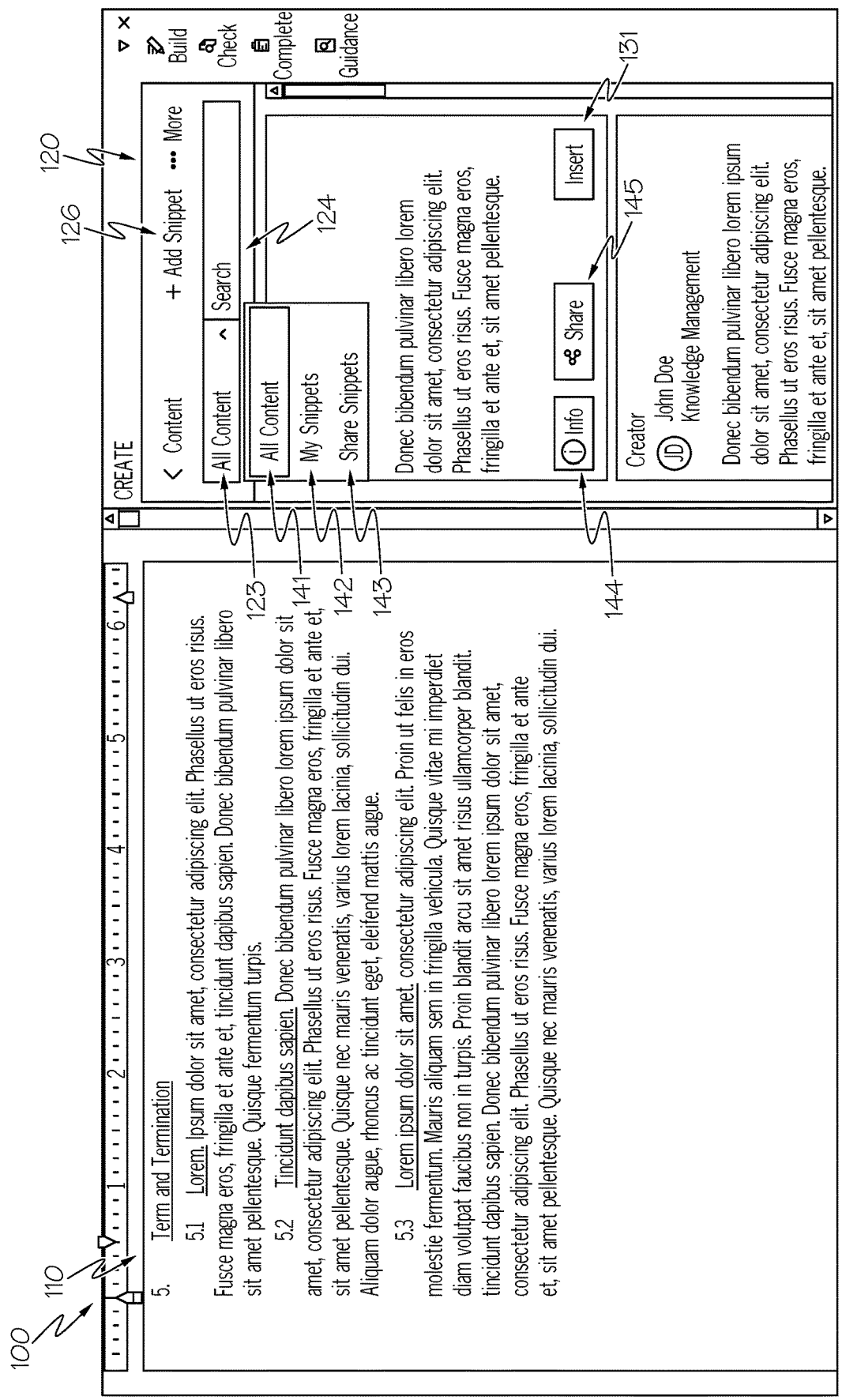
FIG. 5 is an example graphical user interface of a word processing application wherein the electronic document panel displays an electronic document and the clauses panel displays an interface for searching a clauses database according to one or more embodiment described and illustrated herein.

FIG. 4 illustrates an example graphical user interface of the clauses panel 120 showing various graphical elements for searching for clauses, editing clauses, and inserting clauses into an electronic document within the electronic document panel 110. In the illustrated example, the clauses panel 120 displays a database selection drop down box 123 and a search query text box 124. The database selection drop down box 123 allows a user to select a source of clauses to search, as shown in FIG. 5. Users may create a personal clause collection that only he or she can access (e.g., My Snippets 142). These clauses are not shared with other users of the organization. Users also have access to shared clauses that are stored in a database accessible to other members of the organization (e.g., Shared Snippets 143). As described in more detail below, the shared clauses require approval from an approver to properly vet the shared clauses before they are available to other users. In some embodiments, the database selection drop down box 123 allows a user to search all available clause databases (e.g., All Content 141).

Figure 6:
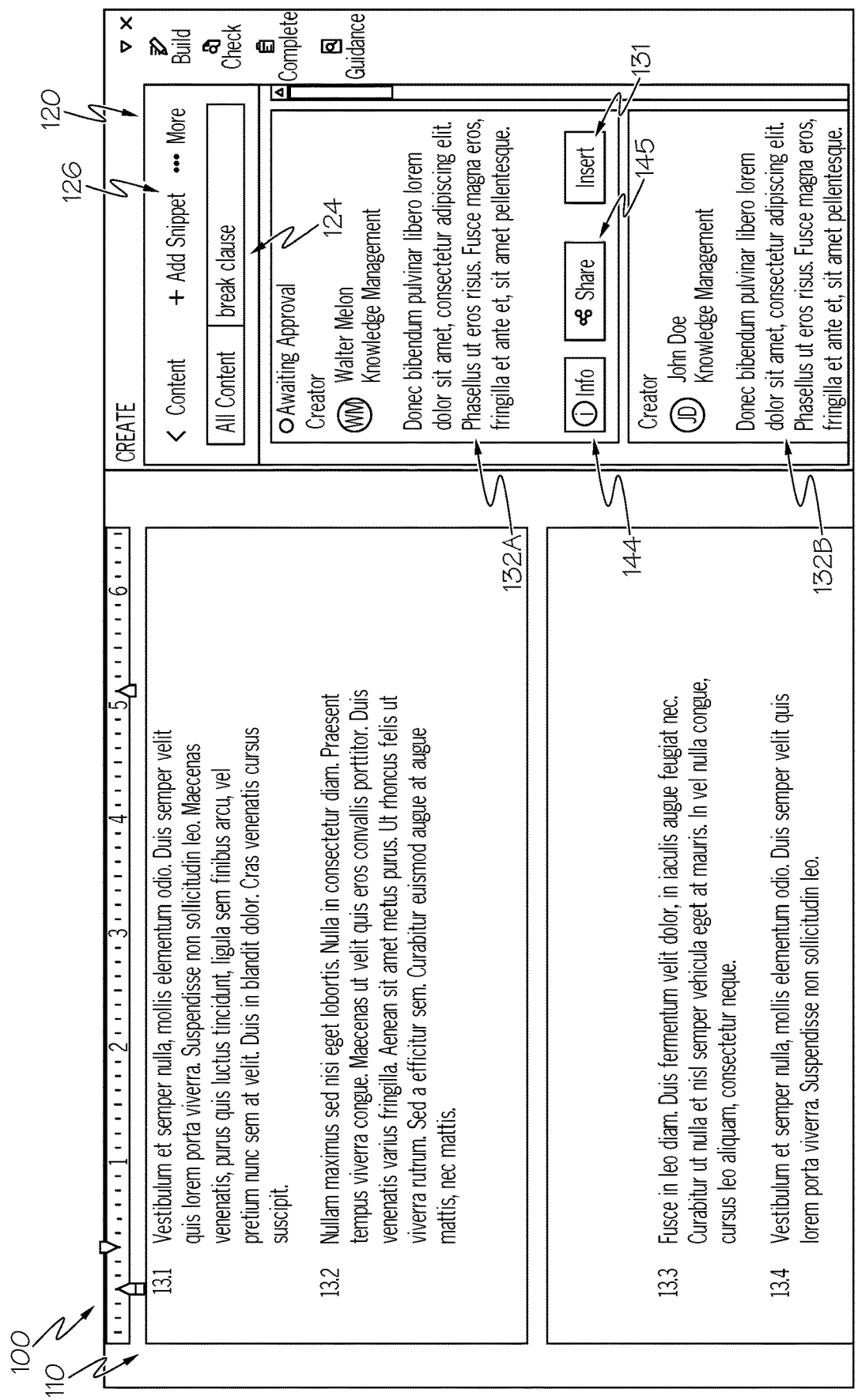
FIG. 6 is an example graphical user interface of a word processing application wherein the electronic document panel displays an electronic document and the clauses panel displays an interface for searching a clauses database according to one or more embodiment described and illustrated herein.

The search query text box 124 enables a user to enter a search query to search one or more clauses databases. For example a user may type "break clause" to retrieve clauses stored in the selected clause database relating to break clauses, as shown in FIG. 6. Retrieved clauses are then displayed.

In some embodiments, the search results include only those snippets that are related to the particular electronic document. In one example, a user may classify the type of electronic document that she is working on. For example, the user may classify the electronic document as an intellectual property licensing agreement. When delivering search query results, the list of snippets may include only those tagged with intellectual property and licensing tags (i.e., display clauses having a clause classification as determined by the tags that match the classification of the electronic document). For example, if an electronic document is classified as a patent assignment, only clauses relating to intellectual property assignments may be displayed.

As another example, the electronic document may be classified automatically without being set by the user. The system may scan the individual electronic document, compare it to other electronic documents within a document corpus to find similar electronic documents, calculate a probability that the individual electronic document is a certain classification type, and then assign a classification having a highest probability to the individual electronic document. As a non-limiting example, the system may create embeddings (e.g., BERT) within the electronic document, and perform a cosign similarity to the embeddings of other documents in the corpus to find the most similar documents.

Figure 7:
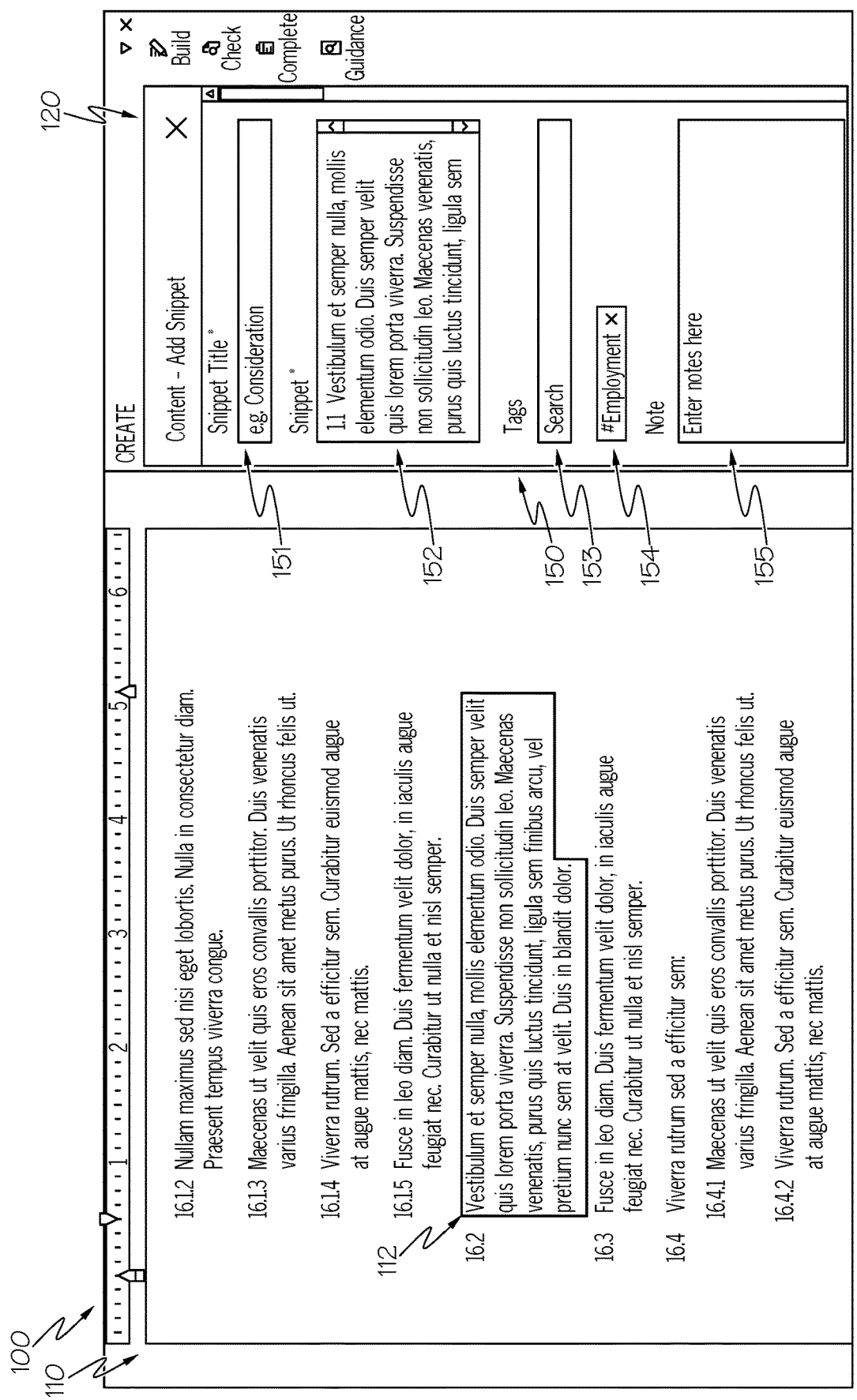
FIG. 7 is an example graphical user interface of a word processing application wherein the electronic document panel displays an electronic document and the clauses panel displays an interface for creating a new clause according to one or more embodiment described and illustrated herein.

Embodiments of the present disclosure provide the ability for users to generate and save their own clauses, for example in either a personal database or a shared database that shares clauses across an organization or even across all users of the software application. FIG. 7 illustrates an example graphical user interface provided by the clauses panel 120 that enables a user to save a clause (i.e., a snippet). The graphical user interface includes a snippet title text box 151, a snippet text box 152, a tags text box 153, a notes text box 155, and a save-to text box 156.

A user may name the snippet by entering text into the snippet title text box 151. The text of the snippet is provided in the snippet text box 152 in a variety of ways. The user may manually type the text into the snippet text box 152. The user may copy the snippet text from another document and past it into the snippet text box 152. The user may copy text from the electronic document displayed in the electronic document panel 110 and paste it into the snippet text box 152. The user may also highlight text within the electronic document displayed in the electronic document panel 110 and, using an input device such as a mouse, drag the highlighted test and drop it into the snippet text box 152. In the illustrated example, highlighted text 112 in the electronic document panel 110 has been dragged and dropped into the snippet text box 152.

Figure 8:
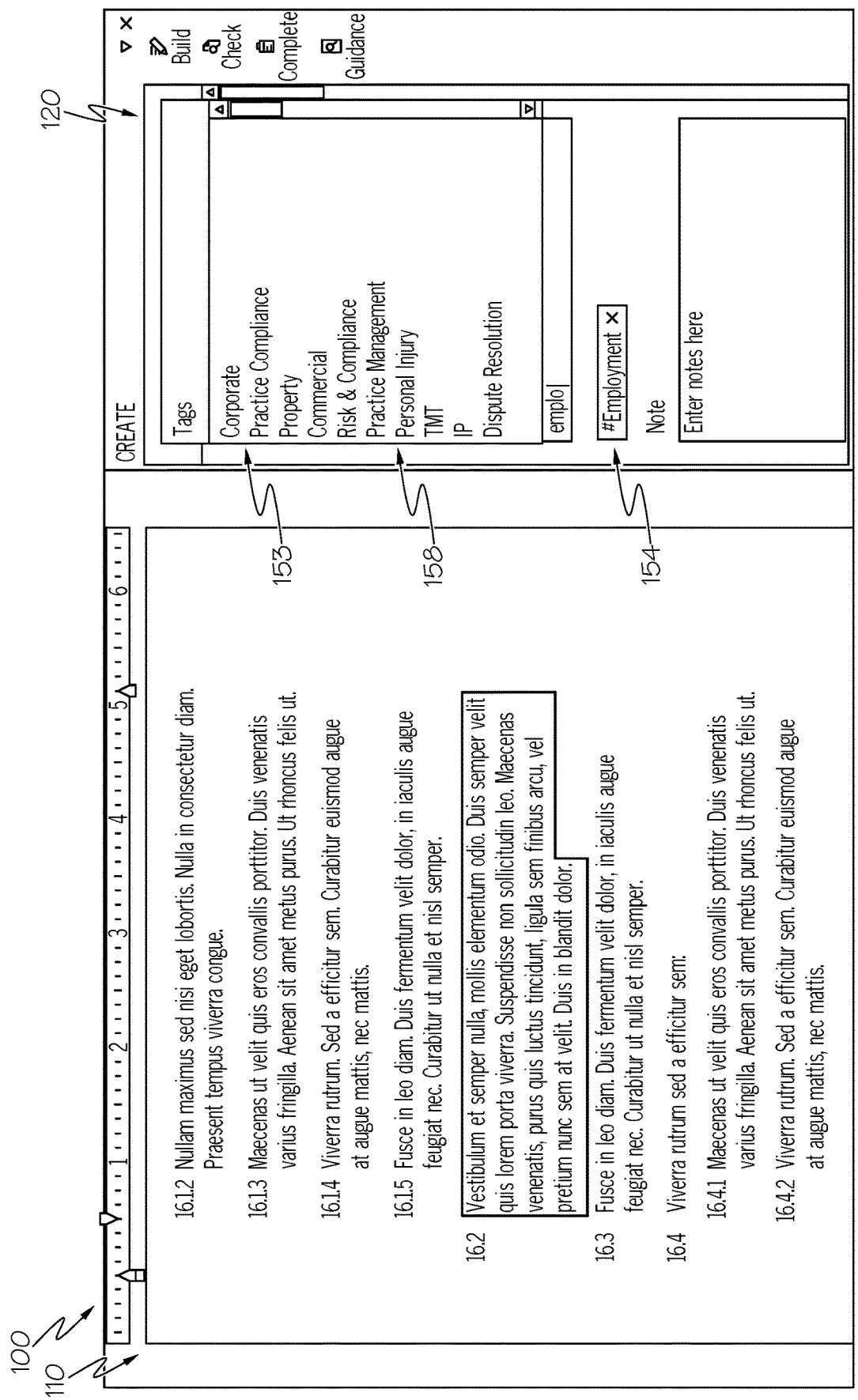
FIG. 8 is an example graphical user interface of a word processing application wherein the electronic document panel displays an electronic document and the clauses panel displays an interface for creating a new clause according to one or more embodiment described and illustrated herein.

A user may add tags to the snippet by entering text into the tags text box 153. The tags may be predefined such that a user may only type in certain tags (e.g., employment). FIG. 8 illustrates an example whereby a drop down box 158 appears and displays available tags as a user types text into the tags text box 153. As a non-limiting example, the tags may be legal practice areas that apply to the snippet (e.g., intellectual property, employment, and the like). Alternatively, the user may enter any text for a tag. The tags that the user enters and selects are displayed in the clauses panel 120. In the example illustrated by FIGS. 7 and 8, the tag "#employment" 154 was previously selected and is displayed within the clauses panel 120.

A user may also save notes within the snippet by entering text within the notes text box 155. The notes may include any text that the user wishes to include. For example, the notes may provide background information regarding the particular snippet, or rationale behind why the user added it.

Figure 9:
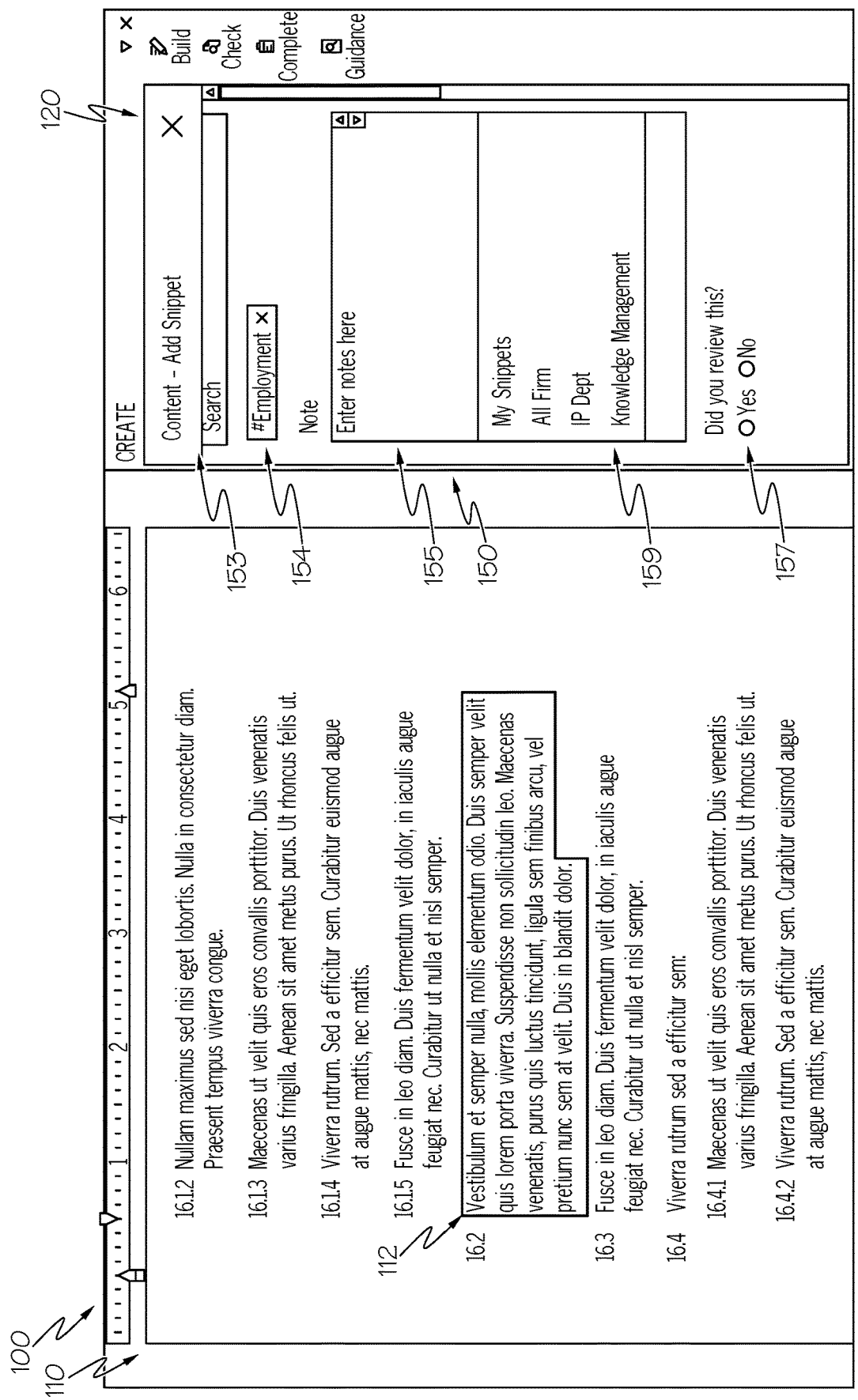
FIG. 9 is an example graphical user interface of a word processing application wherein the electronic document panel displays an electronic document and the clauses panel displays an interface for creating a new clause according to one or more embodiment described and illustrated herein.

The save-to text box 156 allows a user to select which database he or she would like to save the snippet to. Referring to FIG. 9, in some embodiments as the user is typing, various databases are presented in a drop-down box 159. The drop-down box 159 displays available databases, such as a my snippets database that is a personal database, the entire organization or firm, or particular departments. FIG. 9 also illustrates a graphical element 157 in the form of radio buttons that asks the user if he or she reviewed the snippet to help ensure quality control.

Figure 10:
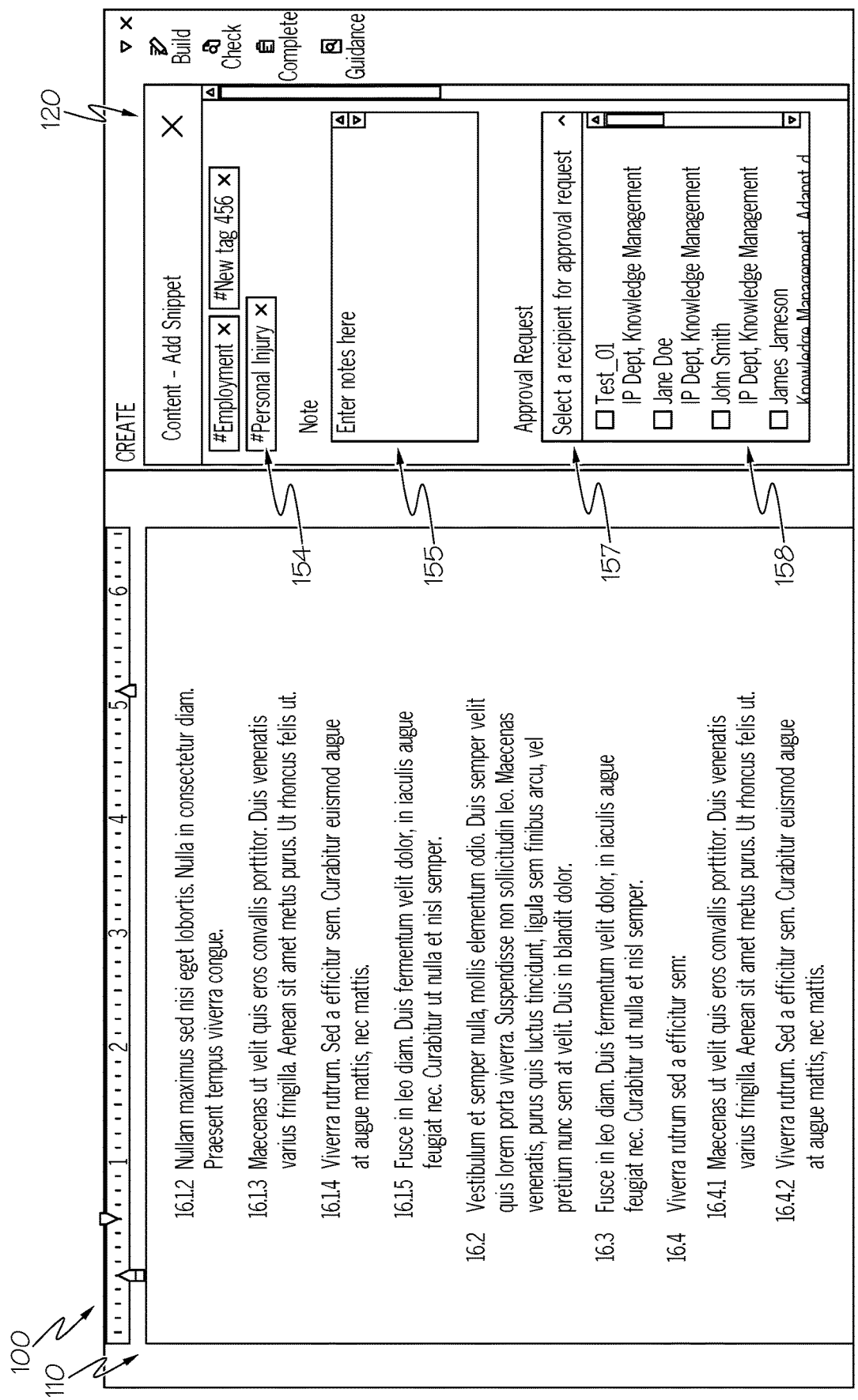
FIG. 10 is an example graphical user interface of a word processing application wherein the electronic document panel displays an electronic document and the clauses panel displays an interface for creating a new clause according to one or more embodiment described and illustrated herein.

Referring now to FIG. 10, the clauses panel 120 also provides an approval text box 157 where a user may select the name of an appropriate approver for the snippet that is being added. When the user clicks in the approval text box 157, a drop-down box 158 of approvers may appear. The user may select one or more approvers from the list of approvers.

When the snippet is saved, it is automatically transmitted to the selected approver(s) for review. The snippet may be electronically transmitted to the selected approver(s) by a variety of means. In one example, an approver has access to an approval dashboard that shows all snippets that are awaiting approval. In another example, the draft snippet is emailed to the selected approver(s). When a snippet is approved by an approver, it is marked "Approved" in the database. A graphical element indicating that the snippet has been approved is then provided in the graphical representation of the snippet. If the snippet has not yet been approved or denied, the snippet may be marked "Awaiting Approval" and a graphical element indicating as such may be displayed in the snippet to let other users know that the snippet has not yet been approved.

Figure 11:
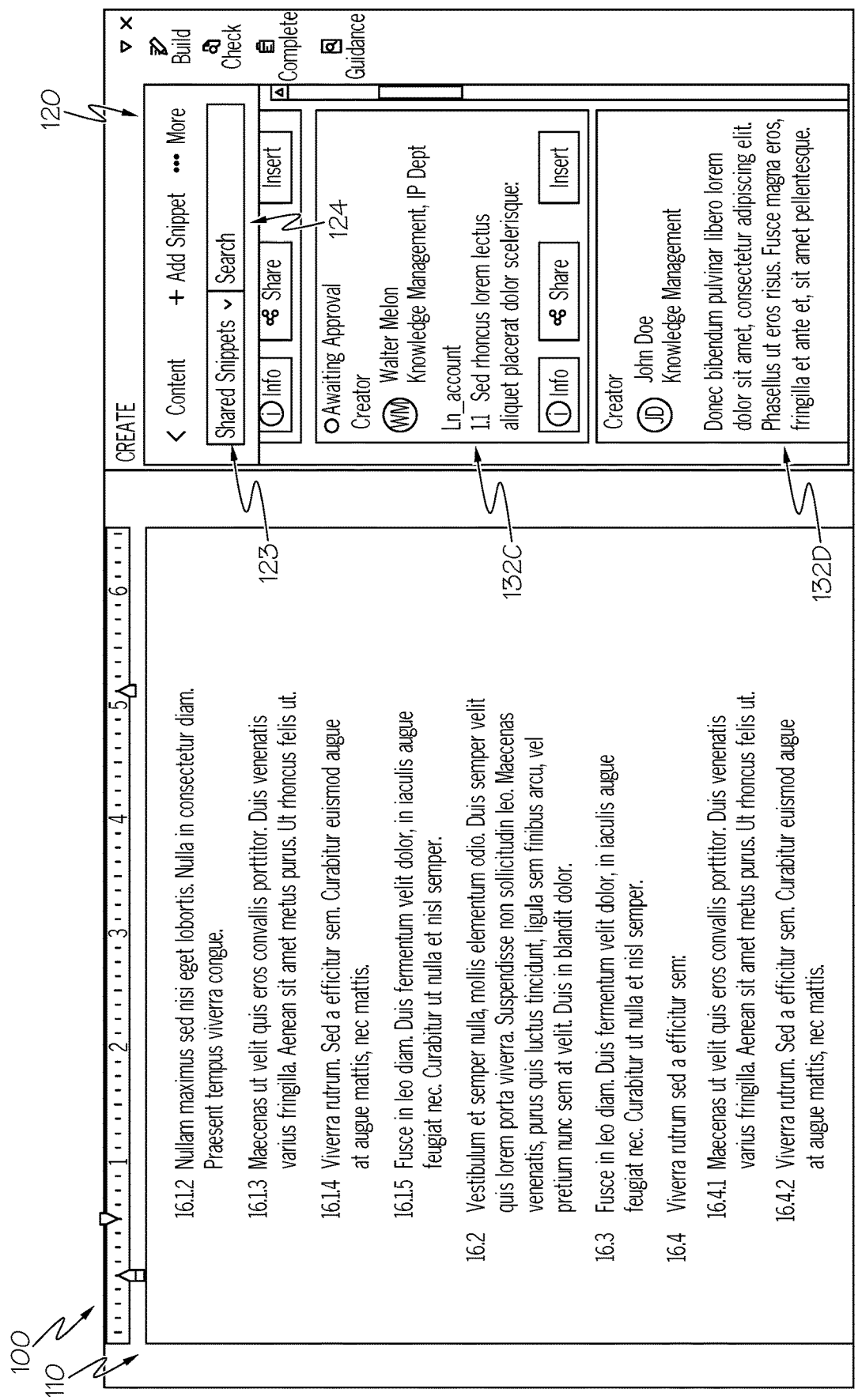
FIG. 11 is an example graphical user interface of a word processing application wherein the electronic document panel displays an electronic document and the clauses panel displays an interface for searching a clauses database according to one or more embodiment described and illustrated herein.

As stated above, users are able to search various snippet databases (i.e., clause databases) for snippets of interest. FIG. 11 illustrates an example clauses panel 120 showing two snippets 132C, 132D. More snippets are available for viewing by scrolling up or down. Each snippet includes a creator name, a title, a portion of snippet text, an approval status indicator, an info button 144, a share button 145, and an insert button 131. The creator name shows the name of the individual who created the snippet, as well as the department for which the individual belongs. The info button 144 causes the clauses panel 120 to display more detailed information regarding the snippet. The share button 145 allows the user to share the snippet with one or more other individuals. For example, the share button 145 may allow the user to email the snippet to one or more other individuals.

The insert button 131 allows the user to insert the snippet text into the electronic document displayed in the electronic document panel 110. In one example, the snippet text is added to the electronic document at a location corresponding to a current position of a cursor in the electronic document. In another example, the user my select the snippet, and drag and drop it into the electronic document at a desired location.

Figure 12:
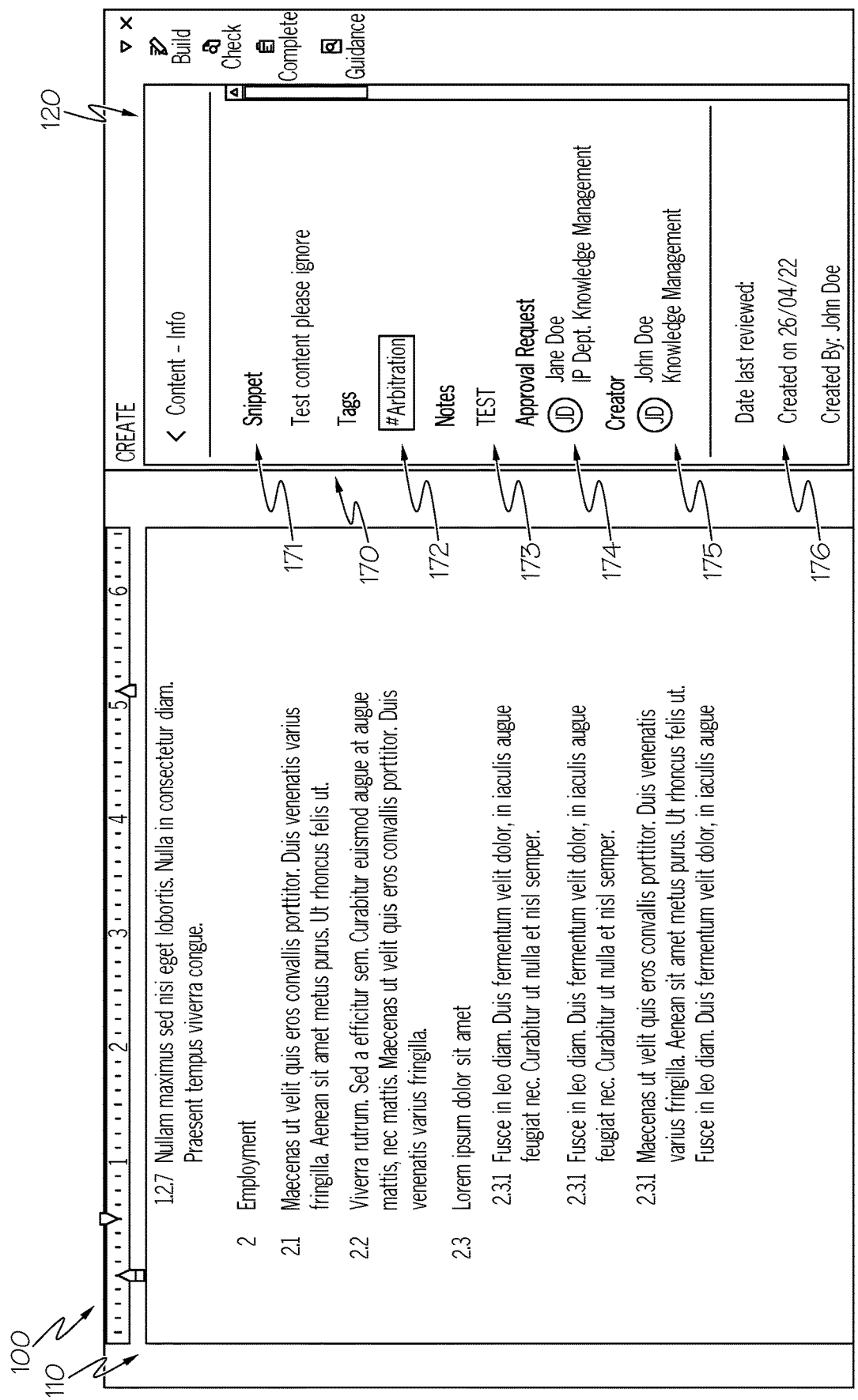
FIG. 12 is an example graphical user interface of a word processing application wherein the electronic document panel displays an electronic document and the clauses panel displays an interface for showing detailed information of a clause according to one or more embodiment described and illustrated herein.

FIG. 12 illustrates a graphical user interface 170 of the clauses panel 120 following the user selecting the info button 144. In this view, the snippet text 171 is displayed, as well as tags 172, any notes 173 that are present, approver information 174, creator information 175, and creation details (e.g., date and time, name of the creator, any other history information). The graphical user interface 170 provides an overview of the selected snippet.

Figure 13:
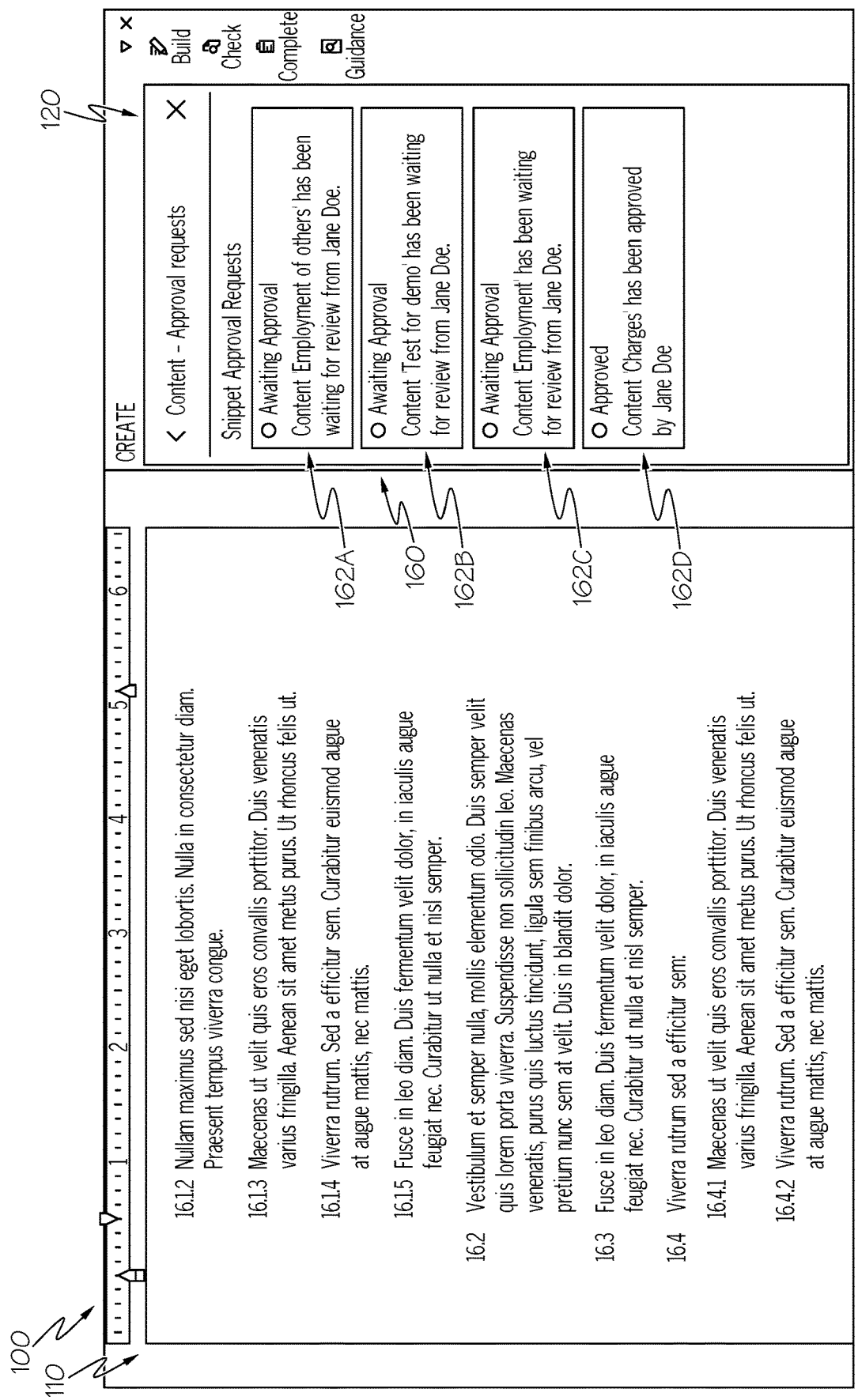
FIG. 13 is an example graphical user interface of a word processing application wherein the electronic document panel displays an electronic document and the clauses panel displays an interface for showing the approval status of clauses according to one or more embodiment described and illustrated herein.

Referring now to FIG. 13, in some embodiments, the clauses panel 120 displays a graphical user interface 160 that displays the approval status of the snippets that have been submitted by the user. In the illustrated example, there are four snippets 162A-162D with approval status information. Snippets 162A-162C are awaiting approval, while snippet 162D has been approved. In this manner, a user may stay on top of the approval status of their snippets. From this interface the user may send reminders, additional information or questions to the approver.

Figure 14:
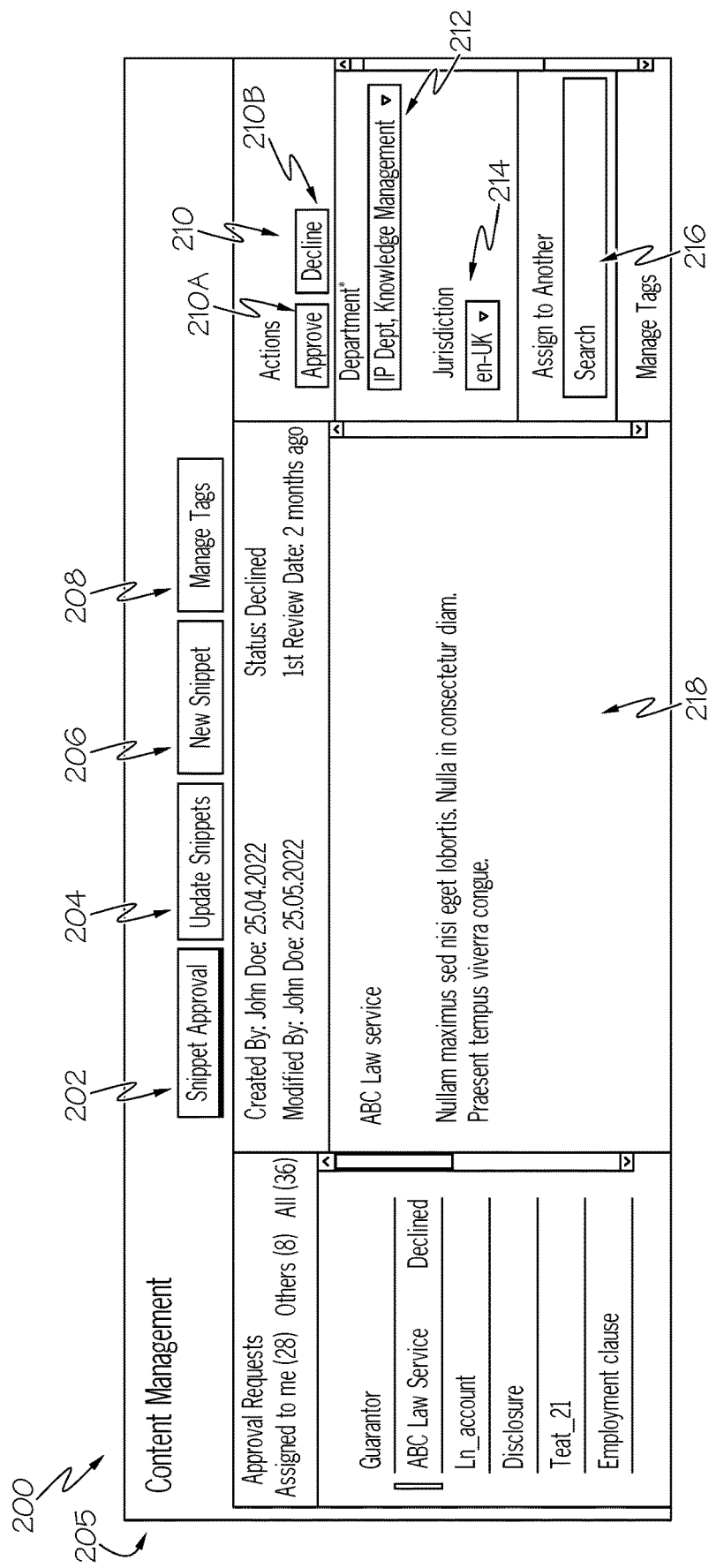
FIG. 14 is an example graphical user interface for approving or declining clauses according to one or more embodiment described and illustrated herein.

FIG. 14 illustrates an example graphical user interface configured as a snippet management dashboard 200 where an approver can manage the snippets for which she is responsible for. The example dashboard 200 includes a snippet approval tab 202, an update snippets tab 204, a new snippet tab 206, and a manage tags tab 208.

When the snippet approval tab 202 is selected, the example dashboard 200 includes a snippet list 205 that lists all of the snippets that are assigned to the particular approver. The status of each snippet is also displayed. For example, the highlighted snippet has a status of Declined. There is also a tab that can show the snippets assigned to others as well as all snippets. Selection of an individual snippet causes the text of the snippet to be displayed in a snippet text field 218.

The example dashboard 200 further includes an actions portion 210 that includes an Approve button 210A and a Decline button 210B. Selection of the Approve button 210A marks the selected snippet as "approved," which will cause it to be displayed as "approved" to users of the system. Similarly, selection of the Decline button 210B marks the selected snippet as "declined," which may cause the snippet to be unavailable to other users. In either case, the creator of the snippet is notified of the approval status update.

The example dashboard 200 further includes a department drop-down box 212, a jurisdiction drop-down box 214, and an assignment text box 216. The department drop-down box 212 and the jurisdiction drop-down box 214 may be pre-populated with information set by the creator. The approver may change the department and/or the jurisdiction by making different selections in the department drop-down box 212 and/or the jurisdiction drop-down box 214. The approver may re-assign the snippet to another approver by typing the name of the new approver in the assignment text box 216, which causes the snippet to appear in the new approver's dashboard.

Figure 15:
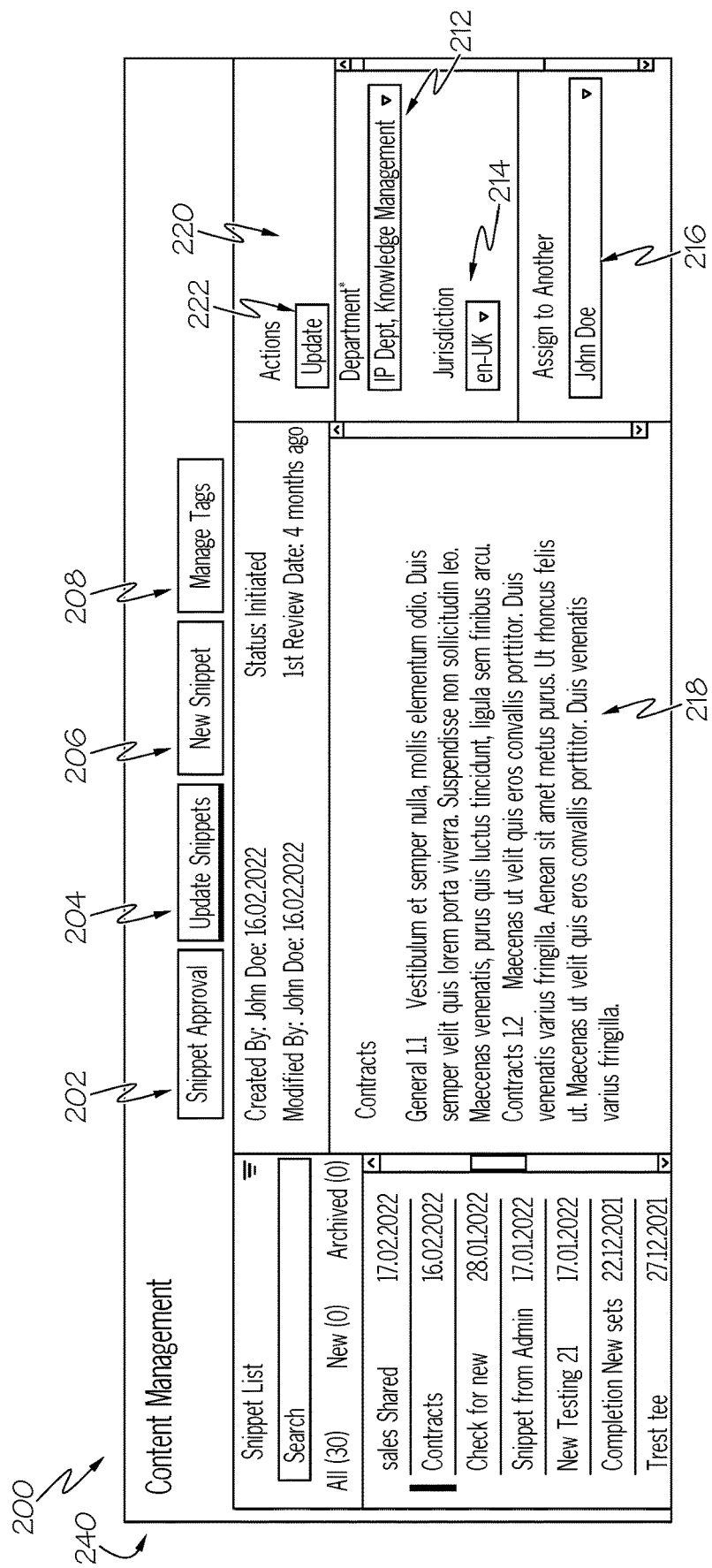
FIG. 15 is an example graphical user interface for updating clauses according to one or more embodiment described and illustrated herein.

When the update snippets 204 tab is selected as shown in FIG. 15, the snippet list 240 displays all of the snippets in the system, as well as their recent edit dates. The user may also select a New tab that shows all recently added snippets, as well as an Archive tab that lists any snippets that are archived and no longer available.

Selection of an individual snippet causes the text of the snippet to be displayed in the snippet text field 218, where the user may make edits to the snippet text. For example, the approver may only have minor edits to the snippet. Rather than decline the snippet, the approver may make the minor edits in the snippet text field 218. When completed, the user may select the Update button 222, which causes the snippet to be updated accordingly. The creator of the snippet may be updated when there is a change to his or her snippet.

The new snippet tab 206 enables a user to create a new snippet using the snippet text field 218.

Figure 16:
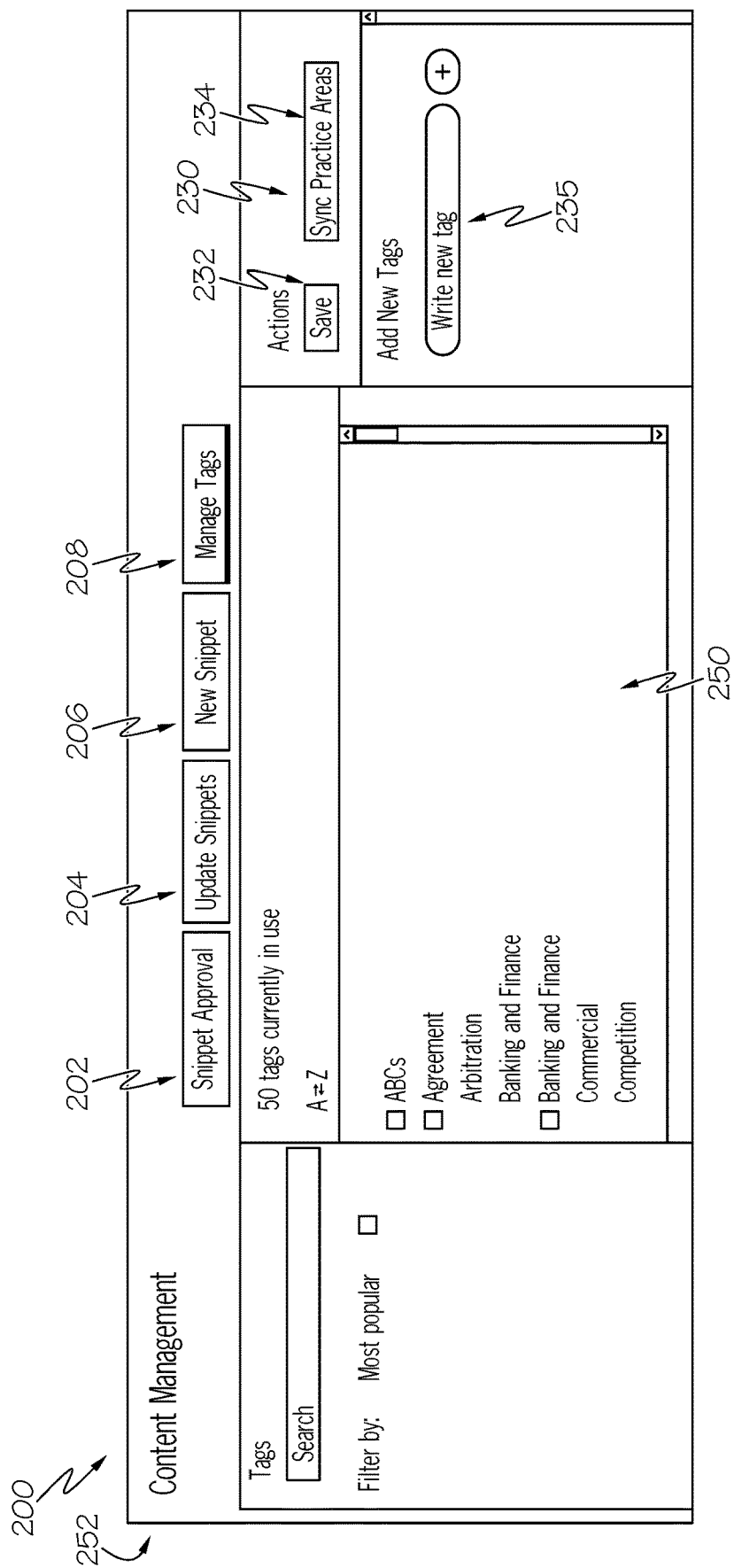
FIG. 16 is an example graphical user interface for managing tags of clauses according to one or more embodiment described and illustrated herein.

Referring to FIG. 16, The manage tags tab 208 provides an interface for creating and managing tags that are available to users when creating snippets. The example interface includes a search text box 252 where a user may enter a search query to search for tags. A filter option for filtering tags by most popular may also be provided. A tag list region 250 displays the available tags. As shown in FIG. 16, the tags may be arranged by practice area in a hierarchical manner. When selecting a tag using the boxes, the user may make edits to the selected tag(s). A new tag element 235 allows a user to add new tags. For example, a user may write the new tag into the text box of the new tag element 235 and click the plus button to add the tag to the list of tags.

A sync action button 232 and a sync practice areas button 234 may be provided.

Figure 17:
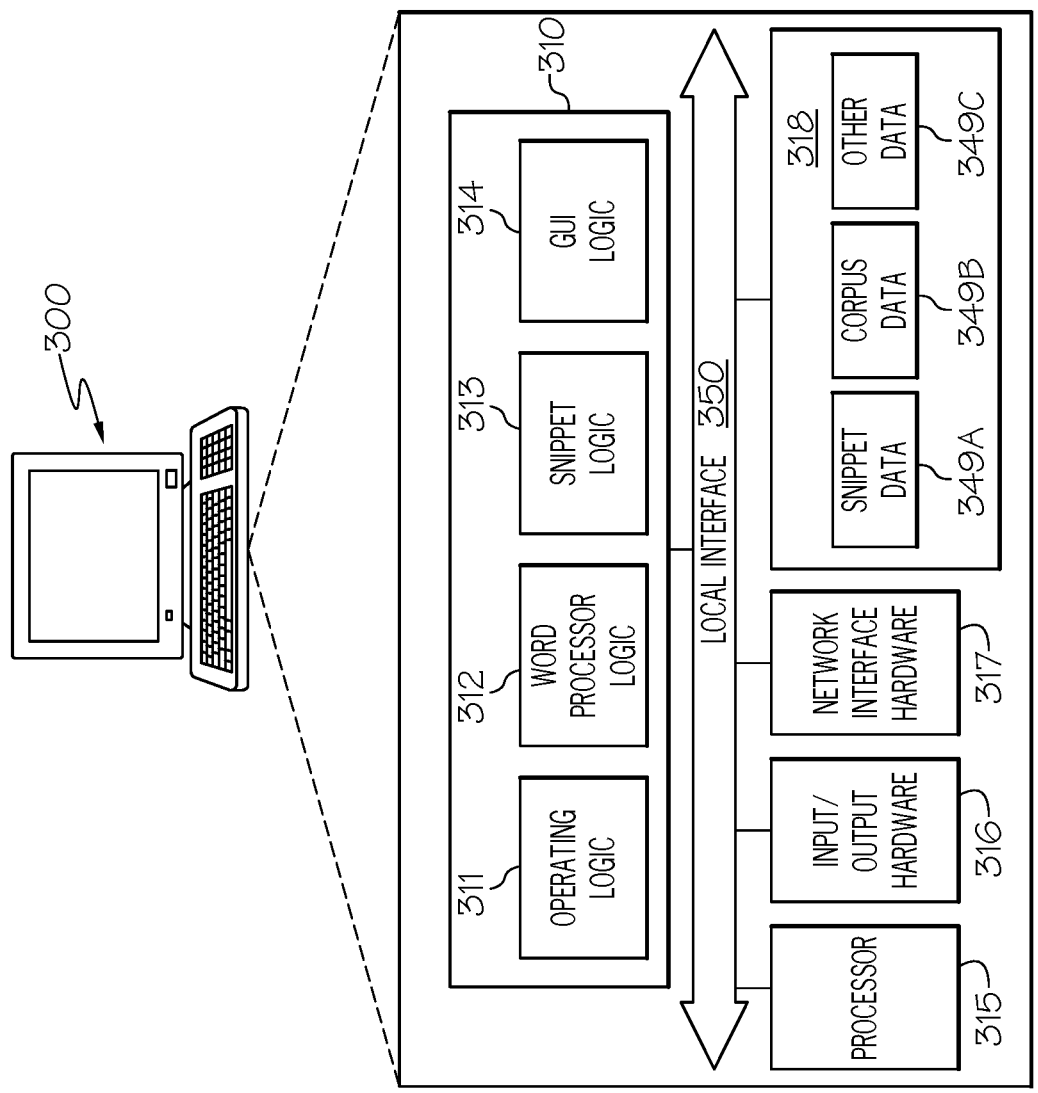
FIG. 17 is an example computer system for managing a clauses database according to one or more embodiment described and illustrated herein.

Embodiments of the present disclosure may be implemented by a computing device, and may be embodied as computer-readable instructions stored on a non-transitory memory device. Referring now to FIG. 17 an example system for managing a clauses database configured as a computing device 300 is schematically illustrated. The example computing device 300 provides a system for managing a clauses database and editing electronic documents and/or a non-transitory computer usable medium having computer readable program code for managing a clauses database and editing electronic documents embodied as hardware, software, and/or firmware, according to embodiments shown and described herein. While in some embodiments, the computing device 300 may be configured as a general purpose computer with the requisite hardware, software, and/or firmware, in some embodiments, the computing device 300 may be configured as a special purpose computer designed specifically for performing the functionality described herein. It should be understood that the software, -hardware, and/or firmware components depicted in FIG. 17 may also be provided in other computing devices external to the computing device 300 (e.g., data storage devices, remote server computing devices, and the like).

As also illustrated in FIG. 17, the computing device 300 (or other additional computing devices) may include a processor 315, input/output hardware 316, network interface hardware 317, a data storage component 318 (which may include snippet data 319A (e.g., snippet text, snippet title, snippet creator, approval status, approver, notes, dates/times, tags, and the like), corpus data 318B (e.g., electronic documents stored in a database), and any other data 319C for performing the functionalities described herein), and a non-transitory memory component 310. The memory component 310 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 310 may be configured to store operating logic 311, word processing logic to perform word processing functions, snippet logic 313 for performing the snippet functionalities described herein, and graphical user interface logic 314 for rendering the graphical user interfaces relating to snippets disclosed herein (each of which may be embodied as computer readable program code, firmware, or hardware, as an example). It should be understood that the data storage component 318 may reside local to and/or remote from the computing device 300, and may be configured to store one or more pieces of data for access by the computing device 300 and/or other components.

A local interface 350 is also included in FIG. 17 and may be implemented as a bus or other interface to facilitate communication among the components of the computing device 300.

The processor 315 may include any processing component configured to receive and execute computer readable code instructions (such as from the data storage component 318 and/or memory component 310). The input/output hardware 316 may include a graphics display device, keyboard, mouse, printer, camera, microphone, speaker, touch-screen, and/or other device for receiving, sending, and/or presenting data. The network interface hardware 317 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 310 may be the store operating logic 311, word processing logic to perform word processing functions, snippet logic 313 for performing the snippet functionalities described herein, and graphical user interface logic 314 for rendering the graphical user interfaces relating to snippets disclosed herein. The operating logic 311 may include an operating system and/or other software for managing components of the computing device 300. The operating logic 311 may also include computer readable program code for displaying the graphical user interface used by the user to input design parameters and review reports. Similarly, the word processor logic 312 may reside in the memory component and be configured to perform traditional word processing functionalities. The snippet logic 313 may reside in the memory component 310 and may be configured to perform the snippet functions described herein (e.g., create and manage snippets, insert snippets into electronic documents, and the like). The graphical user interface logic also may reside in the memory component 310 and may be configured to generate the graphical user interfaces relating to snippets as disclosed herein (e.g., the clauses panel).

The components illustrated in FIG. 17 are merely exemplary and are not intended to limit the scope of this disclosure. More specifically, while the components in FIG. 17 are illustrated as residing within the computing device 300, this is a non-limiting example. In some embodiments, one or more of the components may reside external to the computing device 300.

It will be apparent to those skilled in the art that various modifications and variations can be made without departing from the spirit or scope of the embodiments described herein. Since modifications, combinations, sub-combinations and variations of the disclosed embodiments incorporating the spirit and substance of the embodiments described herein may occur to persons skilled in the art, the embodiments described herein should be construed to include everything within the scope of the appended claims and their equivalents.

What is claimed is:

1. A computer-implemented method for updating a database, the method comprising:
    displaying an electronic document panel within a word processing graphical user interface, wherein the electronic document panel displays text of an electronic document;
    displaying a clauses panel within the word processing graphical user interface, the clauses panel comprising:
        a clauses text box; and
        an approval graphical user element;
    receiving, from one of the electronic document panel and the clauses panel, a clause from a user-created clause collection that the user accesses and a shared clauses collection that is accessible to other users that requires approval to vet a shared clause prior to its availability for selection to the other users;
    populating the clauses text box with the clause;
    receiving a selection of an approver from the approval graphical user element;
    automatically transmitting an approval request to the approver to approve or deny the clause;
    when an approval is received from the approver, automatically storing the clause in the database for use in future documents, wherein the clause is marked as approved such that the clauses panel displays the clause as approved; and
    when no approval or denial is received, automatically storing the clause in the database, wherein the clause is marked as awaiting approval such that the clauses panel displays the clause as awaiting approval.

2. The computer-implemented method of claim 1, wherein the clauses panel further comprises a clause title text box operable to receive text representing a title of the clause for storing in the database.

3. The computer-implemented method of claim 1, wherein the clauses panel further comprises a tag text box operable to receive text representing a tag for the clause for storing in the database.

4. The computer-implemented method of claim 1, wherein the clauses panel further comprises a notes text box operable to receive text representing a note for the clause for storing in the database.

5. The computer-implemented method of claim 1, wherein receiving the clause comprises receiving highlighted text from the electronic document in the electronic document panel.

6. The computer-implemented method of claim 1, wherein the clauses panel further comprises a search text box, and the method further comprises:
receiving, from the search text box, a search query; and
searching the database for clauses having one or more of text and tags matching the search query; and
displaying one or more clauses matching the search query in the clauses panel.

7. The computer-implemented method of claim 6, further comprising:
classifying the electronic document displayed in the electronic document panel;
filtering the clauses matching the search query based on a classification of the electronic document; and
displaying, in the clauses panel, one or more clauses both matching the search query and having a clause classification that matches the classification of the electronic document.

8. The computer-implemented method of claim 1, further comprising:
displaying a plurality of clauses in the clauses panel;
receiving an insertion location within the electronic document;
receiving a selection of a selected clause that is selected among the plurality of clauses; and
inserting the selected clause into the electronic document at the insertion location.

9. The computer-implemented method of claim 1, further comprising: displaying all clauses waiting approval on a dashboard that also includes changing one or more of a department, a jurisdiction, and a re-assignment of the clause; and re-assigning, responsive to input of at least one other user, the clause to the at least one other user for approval.

10. A system for updating a database comprising:
one or more processors;
a non-transitory, computer-readable medium storing instructions that, when executed by the one or more processors, cause the one or more processors to:
display an electronic document panel within a word processing graphical user interface, wherein the electronic document panel displays text of an electronic document; display a clauses panel within the word processing graphical user interface, the clauses panel comprising: a clauses text box; and an approval graphical user element;
receive, from one of the electronic document panel and the clauses panel, a clause from a user-created clause collection that the user accesses and a shared clauses collection that is accessible to other users that requires approval to vet a shared clause prior to its availability for selection to the other users;
receive, from the approval graphical user element, a selection of an approver;
automatically transmit an approval request to the approver to approve or deny the clause; when an approval is received from the approver,
automatically store the clause in the database for use in future documents, wherein the clause is marked as approved such that the clauses panel displays the clause as approved; and
when no approval or denial is received, automatically store the clause in the database, wherein the clause is marked as awaiting approval such that the clauses panel displays the clause as awaiting approval.

11. The system of claim 10, wherein the clause is received by a user highlighting text within the electronic document panel, and the text represents the clause.

\* \* \* \* \*